United States Patent
Prodan et al.

(10) Patent No.: US 8,743,933 B2
(45) Date of Patent: Jun. 3, 2014

(54) FREQUENCY SPECTRUM AND MODULATION SCHEME ALLOCATION FOR HIGH SPEED DATA NETWORKS

(75) Inventors: Richard Prodan, Niwot, CO (US); Niki Pantelias, Duluth, GA (US); Thomas Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 155 days.

(21) Appl. No.: 13/341,651

(22) Filed: Dec. 30, 2011

(65) Prior Publication Data

US 2012/0269242 A1 Oct. 25, 2012

Related U.S. Application Data

(60) Provisional application No. 61/478,334, filed on Apr. 22, 2011.

(51) Int. Cl.
 *H04B 1/38* (2006.01)

(52) U.S. Cl.
 USPC .......... 375/222; 375/219; 375/220; 375/295; 375/316; 375/257

(58) Field of Classification Search
 USPC ................. 375/222, 219, 220, 295, 316, 257
 See application file for complete search history.

(56) References Cited

U.S. PATENT DOCUMENTS

| | | | |
|---|---|---|---|
| 6,898,755 B1* | 5/2005 | Hou | 714/784 |
| 7,007,296 B2* | 2/2006 | Rakib | 725/111 |
| 7,359,332 B2* | 4/2008 | Kolze et al. | 370/252 |
| 8,136,141 B2* | 3/2012 | Al-Banna et al. | 725/111 |
| 2003/0021237 A1* | 1/2003 | Min et al. | 370/252 |
| 2003/0177502 A1* | 9/2003 | Kolze et al. | 725/111 |
| 2005/0122996 A1* | 6/2005 | Azenkot et al. | 370/477 |
| 2007/0032256 A1* | 2/2007 | Kolze | 455/522 |
| 2008/0062889 A1* | 3/2008 | Azenko et al. | 370/252 |
| 2009/0122846 A1* | 5/2009 | Kolze et al. | 375/222 |
| 2009/0215403 A1* | 8/2009 | Currivan et al. | 455/69 |
| 2011/0185263 A1* | 7/2011 | Chapman et al. | 714/776 |
| 2013/0107921 A1* | 5/2013 | Prodan | 375/222 |

\* cited by examiner

*Primary Examiner* — Kenneth Lam (74) *Attorney, Agent, or Firm* — Sterne, Kessler, Goldstein & Fox P.L.L.C.

(57) ABSTRACT

Embodiments provide solutions to reduce power utilization (either at individual cable modems or in the overall network) in future cable modem networks. Particularly, embodiments seek to reduce power utilization at individual cable modems and in the overall network, by allocating upstream frequency bands and/or transmission modulation schemes among cable modems while accounting for cable loss experienced by individual upstream cable modem transmissions. According to embodiments, frequency spectrum and modulation scheme allocation techniques are provided to optimize power utilization and enable lower upstream transmission power by cable modems while maintaining similar signal strength of received signals or lower signal strength with reduced SNR requirements using lower capacity modulation at the headend.

20 Claims, 6 Drawing Sheets

FREQUENCY SPECTRUM AND MODULATION SCHEME ALLOCATION FOR HIGH SPEED DATA NETWORKS

CROSS-REFERENCE TO RELATED APPLICATION(S)

The present application claims the benefit of U.S. Provisional Application No. 61/478,334, filed Apr. 22, 2011, entitled "Frequency Spectrum and Modulation Scheme Allocation for High Speed Data Networks," which is incorporated herein by reference in its entirety.

BACKGROUND

1. Field of the Invention

The present invention relates generally to high speed data networks over hybrid fiber coaxial (HFC) cable plant.

2. Background Art

It is envisioned that in future cable networks the frequency spectrum for upstream communications will be expanded into higher frequency bands (e.g., over 1 GHz, but even extensions to 200 MHz are significant compared to current practice topping out at 42 MHz in North America and 65 MHz in Europe). As such, signal attenuation due to cable loss will become significant for upstream communication in the higher frequency bands, and will also cause signals at the headend to have widely varying signal strengths as signals will experience different cable attenuations depending generally on the length of cabling between the cable modem and the first upstream amplifier, the type(s) of cabling (traversed to the first amplifier), and the frequency bands over which the signals are transmitted.

Existing solutions typically deal with similar problems by having the cable modems use as much transmission power as needed to achieve a desired received signal strength at the headend, without regard to cable length (between the cable modem and first upstream amplifier) or cable type(s) or frequency assignment. Thus, conventional solutions are highly sub-optimal in terms of power utilization.

There is a need for frequency spectrum and modulation scheme allocation techniques that optimize power utilization and enable similar upstream transmission power by cable modems and signal-to-noise (SNR) ratio at the headend.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
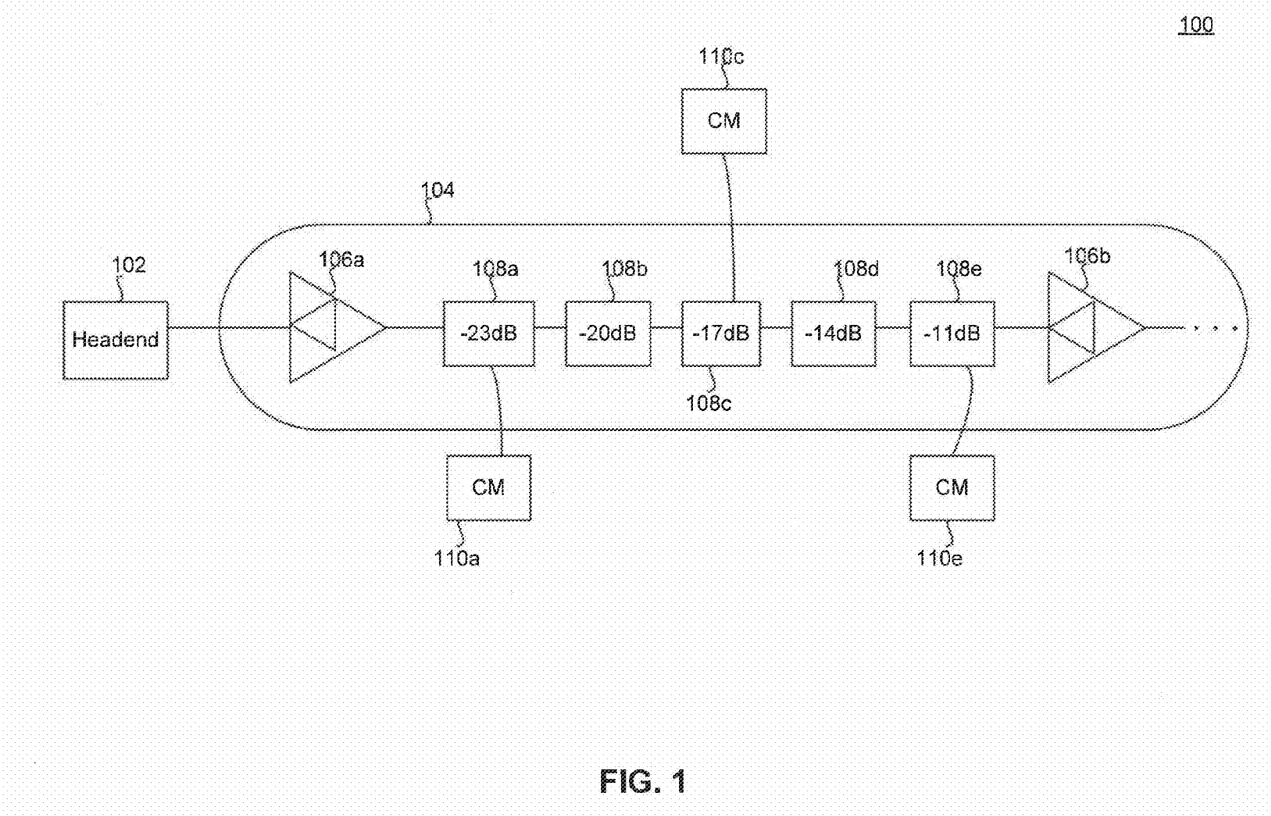
FIG. 1 illustrates an example cable network.

FIG. 1 illustrates a portion of an example cable network 100. As shown in FIG. 1, example network 100 includes a headend 102 that serves a plurality of optical fiber nodes 103 each of which connect cable modems (CMs) 110 over a radio frequency (RF) coaxial distribution network. Headend 102 is connected to CMs 110 via a hybrid fiber coaxial (HFC) network 104.

HFC network 104 includes, in the coaxial portion of the network, repeaters (high power amplifiers with frequency dependent cable attenuation correction networks or equalizers) 106 to ensure that upstream and downstream signals along a coaxial distribution line are received with sufficient signal strength over the entire transmission frequency range. Typically, repeaters are placed along the distribution range at a design distance from one another (e.g., 1000 feet). Between repeaters, a plurality of taps 108 are placed, as needed, to provide individual cable drops from the distribution line to CMs 110. For example, as shown in FIG. 1, tap 108a is used to provide a cable drop to CM 110a.

In the downstream (i.e., from the headend to the CMs), the signal from amplifier 106a drops in terms of signal strength (e.g., by 3 dB) after each cable drop is made from the distribution line as well as due to cable loss. As such, taps 108 are configured to provide different respective signal attenuation levels as illustrated in FIG. 1, for example, to ensure that the CMs receive similar downstream signal strength irrespective of location relative to amplifier 106a. Specifically, the values of taps 108 are selected to account for expected differences in downstream signal strength at taps 108.

In the upstream, because of the different attenuation levels provided by taps 108, the CMs (e.g., DOCSIS CMs) must use a wide range of transmission power levels in order to have their signals received with equal signal strength at headend 102. For example, in FIG. 1, CM 110a must transmit at a power level that is approximately 12 dB higher than that of CM 110e, in order for CMs 110a and 110e to have equal signal strength at headend 102. It is noted however that, in conventional cable networks, differences in signal strength at headend 102 (between signals from different CMs) are only negligibly affected by cable loss. Indeed, even though signal power attenuation in coaxial cable is proportional to the square root of the frequency, the frequency spectrum designated for upstream communications in conventional cable networks is at the low band of 5-42 MHz (e.g., DOCSIS), which is sufficiently low so as not to substantially affect signal strength.

It is envisioned that in future cable networks the frequency spectrum for upstream communications will be expanded into much higher frequency bands (e.g., up to 200 MHz and perhaps even over 1 GHz). As such, signal attenuation due to cable loss will become significant for upstream communication in the higher frequency bands, and will also cause signals at the headend 102 to have widely varying signal strengths as signals will experience different cable attenuations depending on the frequency bands over which they are transmitted.

Existing conventional solutions typically deal with similar problems by having the CMs use as much transmission power as needed to achieve a desired signal strength at the headend. Thus, conventional solutions are highly sub-optimal in terms of power utilization.

Embodiments of the present invention, as further described below, provide solutions that reduce power utilization (either at individual CMs or in the overall network) in future cable networks. Particularly, embodiments seek to reduce power utilization at individual cable modems and in the overall network, by allocating upstream frequency bands or when such frequency bands are fully allocated by assigning transmission modulation schemes among cable modems while accounting for tap and cable losses experienced by individual upstream cable modem transmissions. According to embodiments, frequency spectrum allocation techniques are provided to optimize power utilization and enable lower upstream transmission power by cable modems and similar signal strength of received signals at the headend or when such frequency spectrum has already been allocated and is unavailable, using a lower capacity modulation scheme with lower required SNR at reduced received signal strength. Embodiments may implement techniques described in U.S. Application Publication No. 2007/0032256A1, entitled "Systems and Methods to Transmit Information Among a Plurality of Physical Upstream Channels," which is incorporated by reference herein in its entirety.

Detailed description of example embodiments will now be provided. These example embodiments are provided for the purpose of illustration and are not limiting. For example, embodiments are described with reference to a cable network, but are not limited as such. As would be understood by a person of skill in the art, embodiments may be used in any type of network that can benefit from a frequency spectrum allocation and/or a modulation scheme allocation to enhance individual node capacity and/or overall power utilization.

As noted above, embodiments recognize that, in future cable networks using expanded upstream frequency spectra (e.g., which include both the traditional 5-42 MHz band and additional higher frequency bands over 1 GHz), the frequency band over which a particular signal is transmitted will significantly affect the signal's strength at the headend. In other words, embodiments recognize that the coaxial cable length (i.e., the location of the cable modem from the first repeater and the drop cable length) will be a significant contributor to the attenuation of transmitted signals at high frequencies, but only negligibly affects signal attenuation at low frequencies. At the same time, however, higher frequency bands will generally have lower noise levels.

Figure 2:
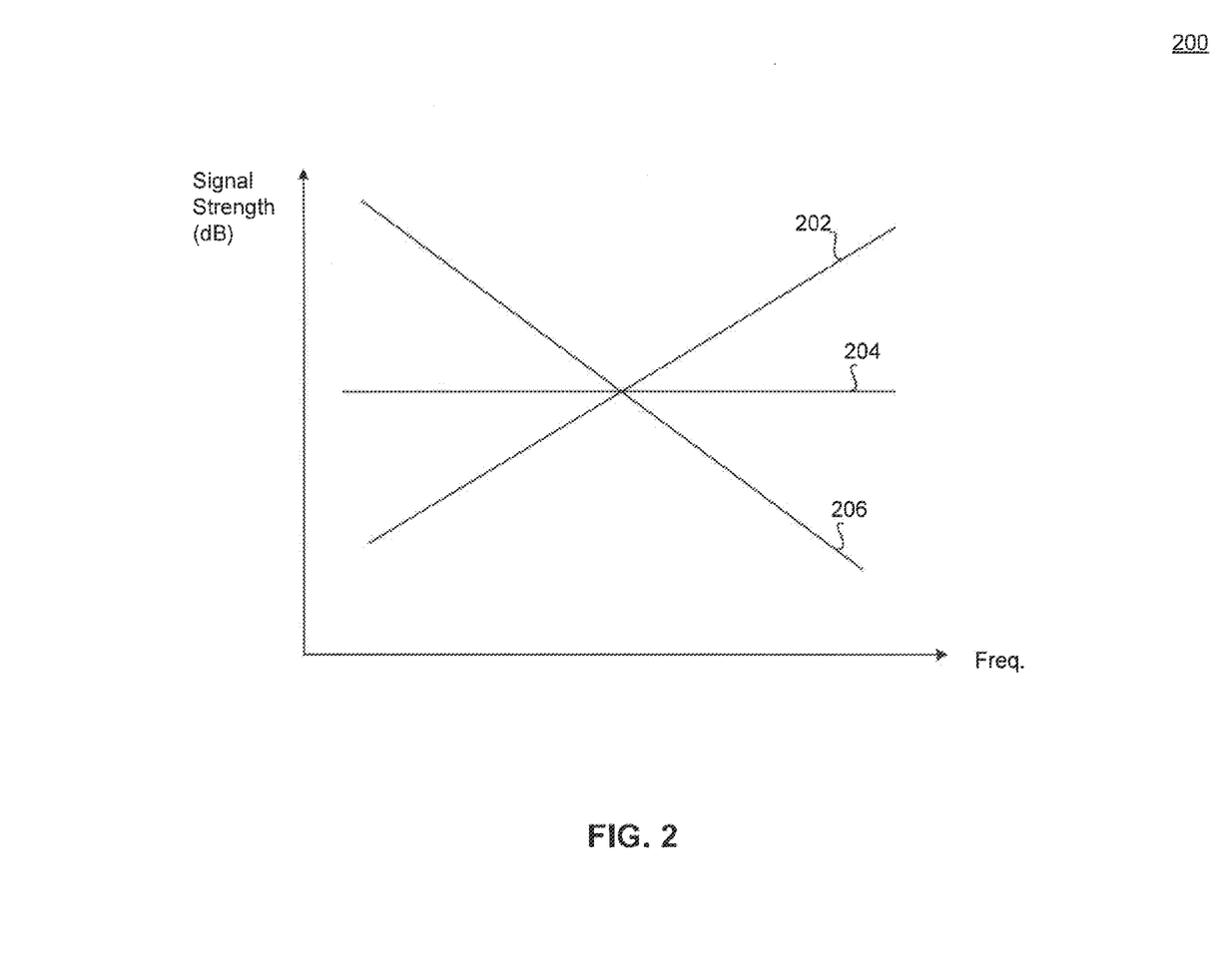
FIG. 2 shows example signal strength versus frequency profiles of cable modems in a cable network.

With the above described characteristics of the upstream frequency spectrum and of coaxial cable, it is anticipated that cable modems will have different signal strength versus frequency profiles measured at the headend. This is illustrated in FIG. 2, for example, which shows example signal-to-noise ratio (SNR) versus frequency profiles of different CMs in a cable network. As would be understood by a person of skill in the art, the example signal strength versus frequency profiles shown in FIG. 2 are illustrative only. In practice, actual signal strength versus frequency profiles may or may not be linear as illustrated in FIG. 2. However, actual signal strength versus frequency profiles will, nonetheless, exhibit certain characteristics as described below.

As shown in FIG. 2, profiles 202, 204, and 206 (which are associated with different CMs) exhibit different signal strength tilts (slopes) as a function of frequency. Specifically, in profile 202, the signal strength improves as frequency increases. In contrast, in profile 206, the signal strength degrades with frequency increasing. In profile 204, the signal strength remains more or less constant with frequency changes.

Profiles 202, 204, and 206 typically result from CMs located at varying cable distances from the first repeater. For example, profiles 202, 204, and 206 may result from CMs 110a, 110c, and 110e, respectively, of cable network 100, described above. Particularly, for CM 110a, with CM 110a being close to amplifier 106a, cable loss is not a dominant factor in its signal strength versus frequency profile. Instead, the signal strength versus frequency profile of CM 110a is primarily affected by the high tap value and the drop cable loss encountered at different frequency bands. Particularly, the signal strength of CM 110a improves with frequency increases due to the fact that higher signal power levels result at the output of the repeater, as shown in profile 202. In contrast, for CM 110e, cascaded taps with interconnecting cable loss is the dominant factor in its signal strength versus frequency profile, with CM 110e being distant from repeater 106a. As such, the signal strength of CM 110e decreases with frequency increases as shown in profile 206, with an increasing amount of signal attenuation being attributed to cable loss (which is proportional to the square of the frequency) as frequency increases.

Embodiments of the present invention exploit the above described anticipated behavior of signal strength (e.g., measured in terms of signal strength) versus frequency profiles of CMs to reduce and/or optimize power utilization in a cable network. In particular, embodiments recognize that certain frequency bands of the upstream frequency spectrum may be optimal or highly power efficient when used by certain CMs, but may be sub-optimal or power inefficient when used by other CMs.

As such, embodiments address the problem of allocation of frequency bands to CMs in a cable network as an optimization problem having known fixed constraints (e.g., maximum cable modem transmit power, minimum required signal strength at headend, etc.) and an objective function (e.g., overall power utilization in the network, variance in signal strength among CMs at the headend, etc.) to minimize/maximize.

Figure 3:
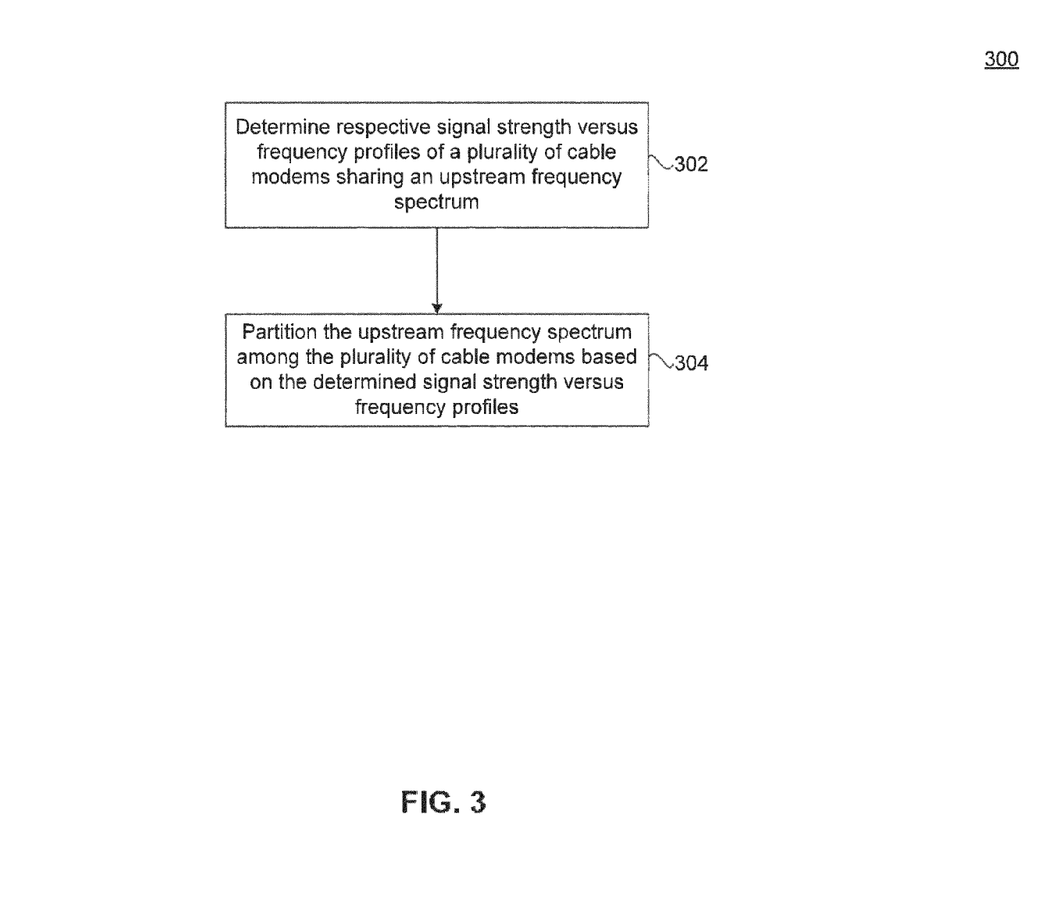
FIG. 3 is a process flowchart of a method of allocating upstream frequency spectrum to cable modems in a cable network according to an embodiment of the present invention.

FIG. 3 is a process flowchart 300 of a method of allocating upstream frequency spectrum to cable modems in a cable network according to an embodiment of the present invention. Process 300 may be performed by the headend, for example.

As shown in FIG. 3, process 300 begins in step 302, which includes determining respective signal strength versus frequency profiles of a plurality of cable modems sharing an upstream frequency spectrum. In an embodiment, the plurality of CMs share one or more coaxial cable distribution lines, for example, in addition to a portion of a HFC network to connect to a headend of the cable network. As such, the CMs share the assigned upstream frequency spectrum to transmit signals to the headend.

In an embodiment, the signal strength versus frequency profiles of the CMs are measured at the headend. Alternatively, the profiles may be measured at a cable modem termination system (CMTS) that sits between the CMs and the headend, and then provided to the headend. Different measures may be associated with the received signal strength, including, for example, the SNR, the bit error rate (BER), etc.

In an embodiment, the signal strength versus frequency profile of a CM is measured and/or updated every time the CM connects to the cable network. For example, at initialization, the headend may request that the CM transmit a test signal at different frequencies. The headend makes successive signal strength measurements based on the CM test transmissions, and determines the profile of the CM. In an embodiment, the headend determines the profile of the CM using a best fit model based on the CM test transmissions.

Figure 5:
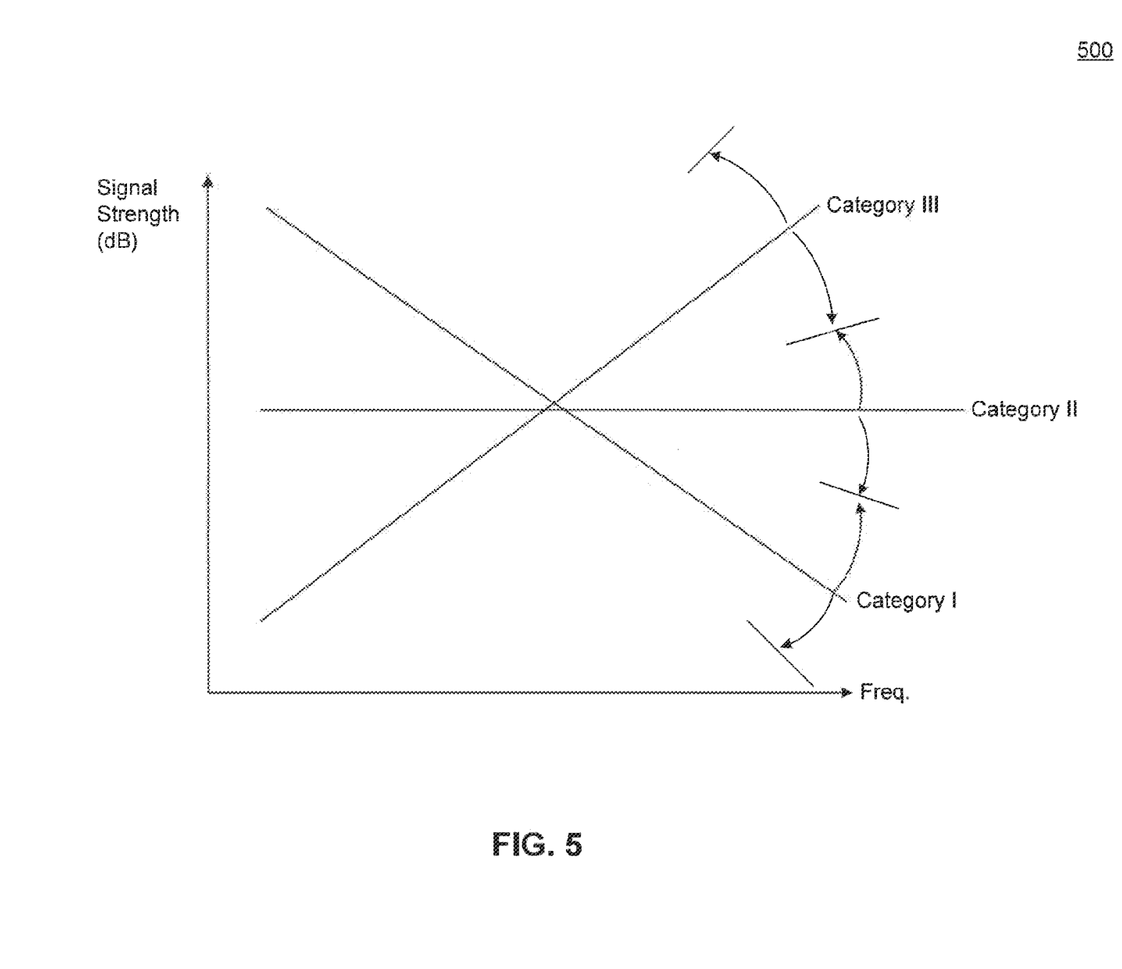
FIG. 5 is an example partition of the signal strength versus frequency space that can be used to allocate upstream frequency spectrum to cable modems in a cable network according to an embodiment of the present invention.

In another embodiment, CMs are grouped based on their signal strength versus frequency profiles into multiple categories. The category that a CM belongs to governs frequency band allocation to the CM. For example, as shown in the example of FIG. 5, the signal strength versus frequency space may be partitioned into three categories I, II, and III. Each CM is associated with one of the categories based on the tilt (or slope) of its signal strength versus frequency profile curve. This category information may be stored at the headend together with other identifying information of the CM. Subsequently, the category information is used by the headend to make frequency allocation decisions (and/or modulation scheme assignment decisions, as further described below) to the CM. This approach makes optimizing frequency allocation more tractable as an optimization problem and more manageable by a flow scheduler, for example.

Referring back to FIG. 3, in step 304, process 300 includes partitioning the upstream frequency spectrum among the plurality of cable modems based on the determined signal strength versus frequency profiles of the cable modems.

In an embodiment, step 304 is performed dynamically by the headend based on available upstream spectrum and the CMs contending for upstream transmissions. As such, frequency band allocation decisions are performed in real time, and frequency band allocations to CMs may change over time based on traffic in the network. As such, at any time that step 304 is performed, the step may involve one or more of the plurality of CMs (not necessarily all) whose profiles are determined in step 302 and one or more available frequency bands of the upstream frequency spectrum.

Alternatively, step 304 is performed only when the topology formed by the cable modems sharing the upstream frequency spectrum changes (e.g., a cable modem is added, disconnected, etc.). As such, a cable modem of the plurality of CMs is assigned a fixed frequency band for upstream communication, which only changes when changes in network topology are detected by the headend. For example, referring to FIG. 1, a CM that connects to the coaxial distribution line via tap 108c may initially (when first connected) be assigned a low frequency band. However, when a high number of CMs are subsequently connected to the distribution line via tap 108a (these CMs place higher demand on the low frequency band), the partition of the upstream frequency spectrum may change, resulting in the CM being assigned a higher frequency band, for example.

In another embodiment, step 304 is performed based on CM category. For example, referring to FIG. 5 and assuming (for the sake of illustration) that the upstream frequency spectrum is divided into a low frequency band and a high frequency band, step 304 then may include partitioning the upstream frequency spectrum so that the low frequency band is allocated to CMs in category I and II and the high frequency band is allocated to CMs in category III, for example. Other allocations may also be made as would be understood by a person of skill in the art. For example, in an embodiment, the low frequency band is allocated to CMs in category I and the high frequency band is allocated to category III. Category I has decreasing signal strength for increasing frequency, and category III has increasing signal strength for increasing frequency. Then, CMs in category II are either assigned the low frequency band or the high frequency band depending on the load in the two bands. As such, load balancing between the low and high frequency bands may be achieved.

The categorization may continue with CMs allocated to a particular favored frequency band as a first choice (as described above), but also with a second identified frequency band as a second-favorite, and so on. Some CMs in some embodiments may have different levels of favoritism assigned on their favored and second-favored frequency bands (e.g., highly favored or important, moderately favored, only slightly favored, etc.). Favored and second-favored frequency bands may differ in bandwidth for a CM and among CM-to-CM. For example, one CM may have a highly favored band at the highest frequencies, and a moderately favored band at mid-frequencies, while another CM may have a moderately favored band at mid-frequencies and slightly favored bands at both higher and lower frequencies. These distinctions may be used in some embodiments in optimization of the network resources and utilization (e.g., the total upstream power supported by the network, the individual CM transmit powers available, the spectrum available, the individual data rates and QoS of each CM according to its priorities, the composite data rate of the network and overall satisfaction of the collection of CMs' QoS, at a given point in time and over a duration of time).

In embodiments using dynamic frequency allocation, frequency band allocation may also be made based on individual flows from the cable modems. As such, flows from the same cable modem may be assigned different frequency bands of the upstream frequency spectrum. In an embodiment, frequency band allocation also accounts for flow priority levels in making frequency band allocation decisions. For example, a high priority flow from a cable modem may always be assigned the best available frequency band based on the cable modem it originates from. On the other hand, a low priority flow from the same cable modem may be assigned a sub-optimal frequency band so as to free the optimal frequency band for higher priority flows. As would be understood by a person of skill in the art, other flow servicing schemes may also be used with different flow assignment rules as appropriate.

In the same way that embodiments exploit the signal strength versus frequency profiles of CMs to optimize upstream frequency spectrum allocation, embodiments can make use of the same profiles when such frequency spectrum has already been allocated and is unavailable, by using a lower capacity modulation scheme with lower required SNR at reduced received signal strength. In this case, lower capacity modulation schemes are assigned to such CMs so as to reduce the required SNR to enable lower available upstream transmission power by CMs resulting in lower received signals with reduced SNR at the headend. This will reduce capacity for such a CM but maintains the received signal QoS (such as BER or packet loss rate) when preferable frequency spectrum is unavailable due to assignment to other CMs with for instance higher priority flows. In some cases, capacity for a CM may be maintained or even increased even if preferable frequency spectrum is unavailable by using the techniques described in U.S. Application Publication No. 2007/0032256A1, entitled "Systems and Methods to Transmit Information Among a Plurality of Physical Upstream Channels," which is incorporated by reference herein in its entirety. Further, these embodiments may be used in both traditional (i.e., single low frequency band) and future (i.e., expanded low and high frequency bands) upstream frequency spectra.

Figure 4:
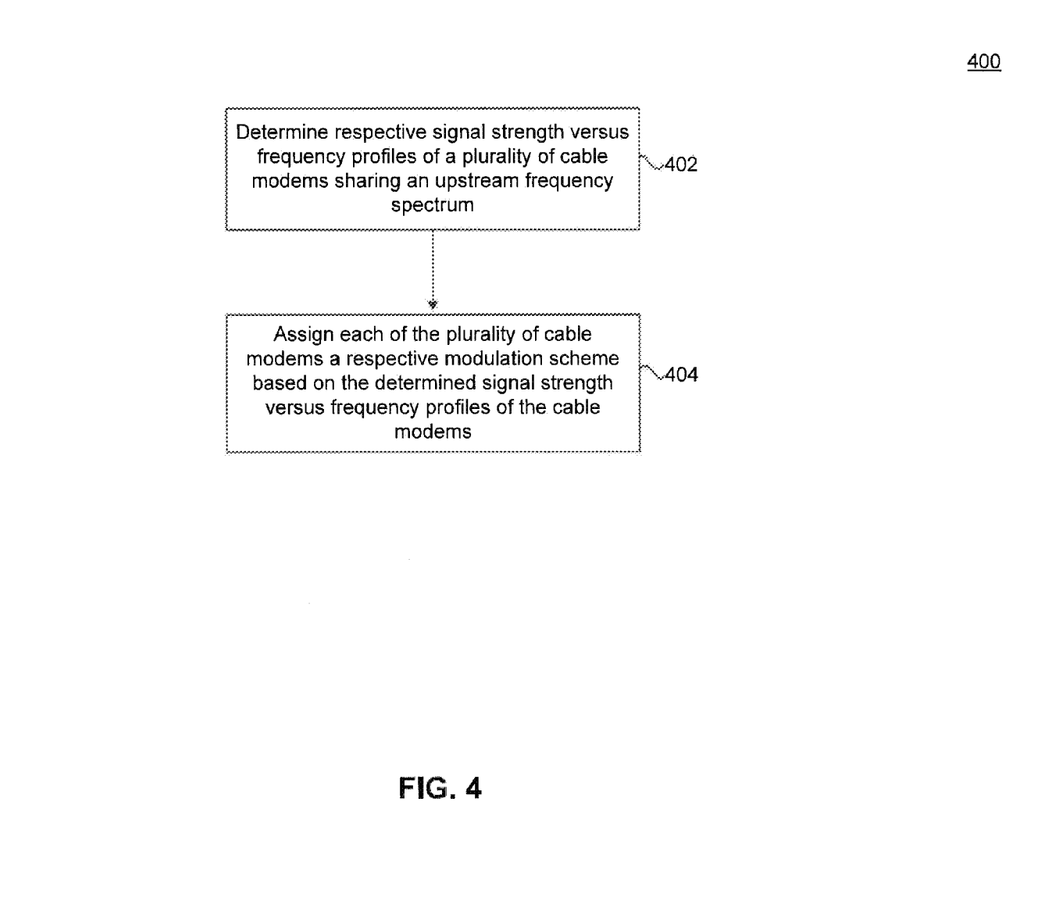
FIG. 4 is a process flowchart of a method of assigning transmission frequency bands to cable modems in a cable network according to an embodiment of the present invention.

FIG. 4 is a process flowchart 400 of a method of assigning modulation schemes to cable modems in a cable network according to an embodiment of the present invention. Process 400 may be performed by the headend, for example.

As shown in FIG. 4, process 400 begins in step 402, which includes determining respective signal strength versus frequency profiles of a plurality of cable modems sharing an upstream frequency spectrum. In an embodiment, the plurality of CMs share one or more coaxial distribution lines, for example, in addition to a portion of a HFC network to connect to a headend of the cable network. As such, the CMs share the assigned upstream frequency spectrum to transmit signals to the headend.

Step 402 is similar to step 302 described above with reference to process 300. As such, step 402 may be performed at the headend or at a CMTS or a portion of a CMTS that sits between the CMs and the headend. Measuring the signal strength versus frequency profile of a CM is done as described above with reference to FIG. 3. In addition, the measured signal strength versus frequency profiles may be used to group CMs into multiple categories, which are then used as the basis for the assignment of upstream transmission frequency bands, or when a preferred frequency band is unavailable, for assignment of lower capacity modulation schemes to CMs.

Referring back to FIG. 4, in step 404, process 400 includes assigning each of the plurality of cable modems a respective frequency allocation based on the determined signal strength versus frequency profiles of the cable modems. According to embodiments, the objective of step 404 is to reduce power utilization by assigning frequency allocations to CMs so that required power levels at the headend are met without the need to transmit at high power levels. In another embodiment, step 404 may include ensuring that lower aggregate transmit power is used by all CMs such that the same SNR level is seen by the headend from all CMs. Thus step 404 may be performed according to an optimization problem with an objective function and a set of constraints. Further, according to embodiments, a multiplicity of modulation schemes may be determined for each CM, e.g., based on the favored and second-favored, etc., frequency bands for each CM, and then the modulation scheme may be assigned dynamically depending on the existing needs and priorities (QoS) of an individual CM in view of the needs and priorities of the collection of CMs in the network.

Frequency spectrum and modulation scheme assignment according to embodiments may be performed dynamically (i.e., in real time), at fixed intervals, when the network topology changes, or only once for each CM when the CM connects to the network. In addition, the frequency allocation scheme and the modulation scheme assignment can be made per CM or per flow. When per flow assignment is used, different flows from the same CM may be transmitted using different frequencies bands and modulation schemes. Such assignment decisions may be made by a scheduler at the headend and transmitted to CMs.

In view of the teachings above, a person of skill in the art would appreciate that a variety of algorithms may be used to enable frequency spectrum allocation and/or modulation scheme assignment according to embodiments of the present invention. Specifically, embodiments extend to any algorithm that makes uses of measured/estimated/anticipated signal strength versus frequency profiles to optimize one or more performance parameters (e.g., power utilization, SNR levels, transmit powers, throughput, network load, etc.) according to a set of constraints (e.g., limited upstream frequency spectrum, available upstream frequency bands, maximum CM transmit power, minimum required SNR, minimum required throughput per CM/flow, flow priority, etc.). As described above, in practice, embodiments may be implemented by grouping CMs into different categories, thus making the optimization more tractable.

Figure 6:
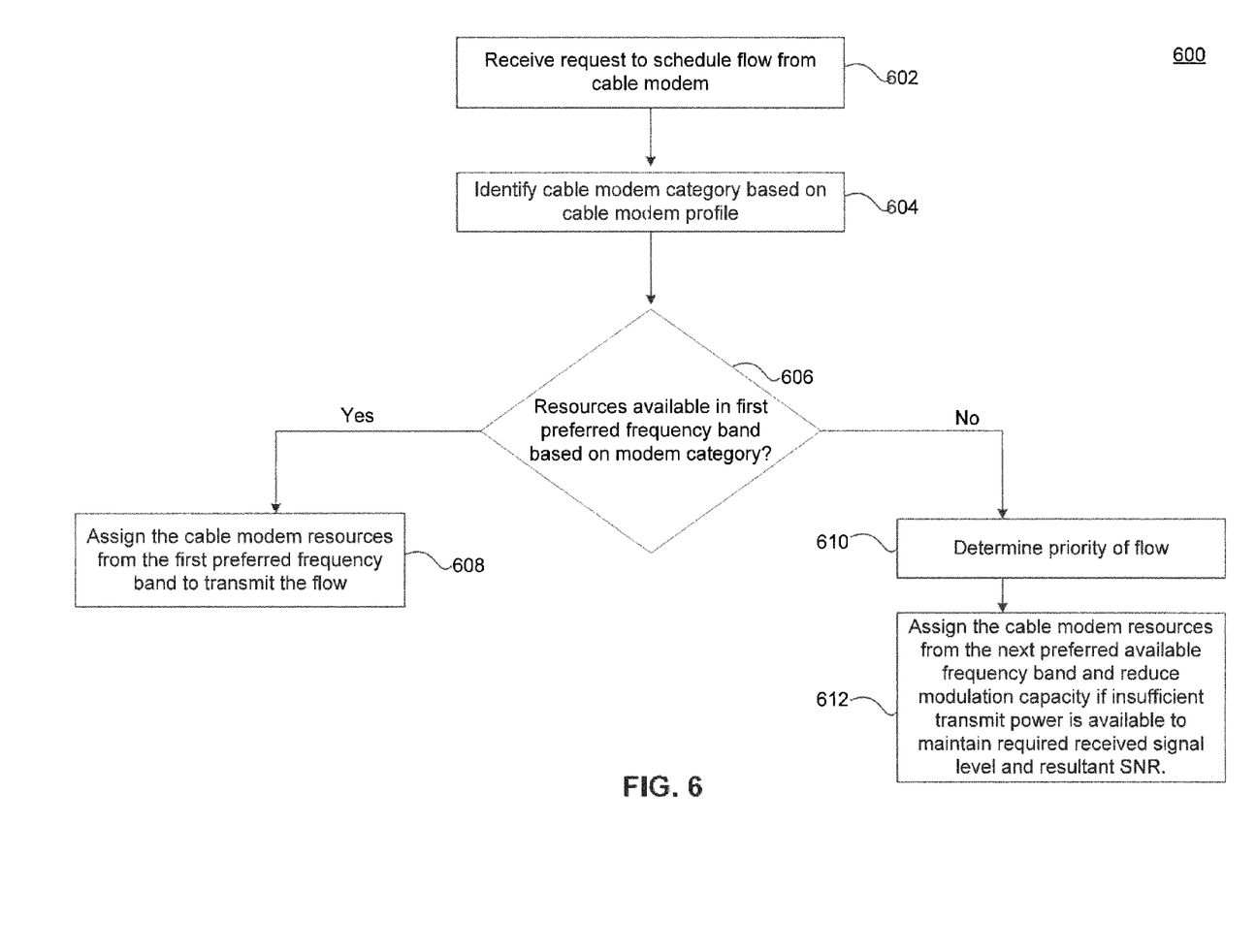
FIG. 6 is a process flowchart of a method of scheduling upstream flows in a cable network according to an embodiment of the present invention.

An example method of scheduling upstream flows in a cable network according to an embodiment of the present invention is described in process flowchart 600 of FIG. 6. Example process 600 is performed at the headend or at a CMTS, by a flow scheduler, for example.

As shown in FIG. 6, process 600 begins in step 602, which includes receiving a request to schedule a flow from a cable modem. In an embodiment, the request includes an identification of the cable modem and a priority level of the flow (e.g., required QoS).

In step 604, process 600 includes identifying a cable modem category based on a cable modem profile of the cable modem. In an embodiment, the cable modem profile (e.g., signal strength versus frequency) is measured and the cable modem is associated with a cable modem category a priori. Subsequently, when the flow scheduling request is received, the cable modem identification is mapped to the associated cable modem category via a lookup table, for example.

After the cable modem category is determined, process 600 proceeds to step 606, which includes determining whether or not resources are available in a first preferred frequency band of the upstream frequency spectrum, based on the cable modem category. In an embodiment, as described above, the upstream frequency spectrum is partitioned among the cable modems according to cable modem categories, based on measured signal strength versus frequency profiles of the cable modems.

If resources are available in the first preferred frequency band, then process 600 proceeds to step 608, which includes assigning the cable modem (or more specifically the flow) resources from the first preferred frequency band to transmit the flow. Otherwise, process 600 proceeds to step 610.

Step 610 includes determining the priority level of the flow. In an embodiment, the priority level of the flow is included in the flow scheduling request. Then, based on the priority level of the flow, step 612 includes assigning the cable modem resources from a next preferred available frequency band and if necessary reducing the transmission rate using a lower capacity modulation until resources from the first preferred frequency band at the higher capacity modulation become available. For example, the high priority flow may be transmitted even if resources are not available in its preferred band (i.e., the flow is important enough that the use of a suboptimal frequency band at lower data rate is tolerated).

As would be understood by a person of skill in the art based on the teachings, embodiments are not limited by example process 600, which is provided for illustration purposes only.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method of allocating upstream frequency spectrum to cable modems in a high speed data network, comprising:
    determining respective signal strength versus frequency profiles of a plurality of cable modems, wherein said plurality of cable modems share an upstream frequency spectrum; and
    partitioning said upstream frequency spectrum among said plurality of cable modems based on said signal strength versus frequency profiles, wherein the partitioning comprises assigning to each cable modem of the plurality of cable modems a respective frequency band of a plurality of frequency bands that form the upstream frequency spectrum.

2. The method of claim 1, wherein said plurality of cable modems share a coaxial cable distribution line.

3. The method of claim 1, wherein said determining step comprises:
    measuring said signal strength versus frequency profiles at a headend of the high speed data network.

4. The method claim 1, wherein said determining step comprises:
    measuring said signal strength versus frequency profiles at a cable modem termination system (CMTS) or other physical layer termination point of the high speed data network.

5. The method of claim 1, wherein said signal strength versus frequency profiles represent signal-to-noise ratio (SNR) versus frequency profiles.

6. The method of claim 1, wherein said determining step comprises:
    receiving test signal transmissions having various frequencies from a cable modem of the plurality of cable modems; and
    performing successive signal strength measurements based on the test signal transmissions to determine the respective signal strength versus frequency profile of the cable modem.

7. The method of claim 1, wherein said determining step comprises:
    determining or updating a signal strength versus frequency profile of a cable modem of said plurality of cable modems when said cable modem connects to said high speed data network.

8. The method of claim 1, further comprising:
    grouping said plurality of cable modems into a plurality of categories based on said signal strength versus frequency profiles.

9. The method of claim 8, wherein said partitioning step comprises:
    partitioning said upstream frequency spectrum among said plurality of cable modems based on said plurality of categories.

10. The method of claim 1, wherein said partitioning step comprises:
    dynamically partitioning available spectrum of said upstream frequency spectrum based on signal strength versus frequency profiles of cable modems with contending upstream transmissions.

11. The method of claim 1, wherein said partitioning step comprises:
    partitioning said upstream frequency spectrum among said plurality of cable modems when a network topology formed by said plurality of cable modems changes.

12. The method of claim 1, wherein said partitioning step comprises:
    assigning said each cable modem of said plurality of cable modems a fixed frequency band for upstream communication.

13. The method of claim 1, wherein said partitioning step comprises:
    partitioning said upstream frequency spectrum among individual flows from one or more of said plurality of cable modems.

14. The method of claim 13, wherein said partitioning step further comprises:
    partitioning said upstream frequency spectrum among said individual flows based on priority levels of said individual flows.

15. The method of claim 1, further comprising:
    assigning respective modulation schemes to said plurality of cable modems based on said signal strength versus frequency profiles.

16. A cable network, comprising:
    a headend; and
    a plurality of cable modems coupled via a coaxial distribution network to the headend, wherein the plurality of cable modems share an upstream frequency spectrum for communicating with the headend,
    wherein the headend is configured to determine respective signal strength versus frequency profiles for the plurality of cable modems, and to partition the upstream frequency spectrum among said plurality of cable modems based on said signal strength versus frequency profiles, and wherein headend is further configured to assign to each cable modem of the plurality of cable modems a respective frequency band of a plurality of frequency bands that form the upstream frequency spectrum.

17. The cable network of claim 16, wherein said signal strength versus frequency profiles represent signal-to-noise ratio (SNR) versus frequency profiles.

18. The cable network of claim 16, wherein the headend is further configured to group said plurality of cable modems into a plurality of categories based on said signal strength versus frequency profiles.

19. The cable network of claim 18, wherein the headend is further configured to partition the upstream frequency spectrum among said plurality of cable modems based on said plurality of categories.

20. The cable network of claim 16, wherein the headend is further configured to dynamically partition available spectrum of the upstream frequency spectrum based on signal strength versus frequency profiles of cable modems with contending upstream transmissions.

* * * * *

UNITED STATES PATENT AND TRADEMARK OFFICE
CERTIFICATE OF CORRECTION

| | | |
|---|---|---|
| PATENT NO. | : 8,743,933 B2 | Page 1 of 1 |
| APPLICATION NO. | : 13/341651 | |
| DATED | : June 3, 2014 | |
| INVENTOR(S) | : Prodan et al. | |

It is certified that error appears in the above-identified patent and that said Letters Patent is hereby corrected as shown below:

In the Claims:

In column 9, line 30, claim 4, please insert --of-- between --method-- and --claim--.

Signed and Sealed this
Ninth Day of September, 2014

Michelle K. Lee
*Deputy Director of the United States Patent and Trademark Office*